United States Patent
Virdee

(10) Patent No.: US 7,355,985 B2
(45) Date of Patent: Apr. 8, 2008

(54) AUTOMATIC UPDATE OF SQUELCH TABLES FOR OPTICAL NETWORK APPLICATIONS

(75) Inventor: Harbhajan Virdee, Richardson, TX (US)

(73) Assignee: FutureWei Technologies, Inc., Plano, TX (US)

( * ) Notice: Subject to any disclaimer, the term of this patent is extended or adjusted under 35 U.S.C. 154(b) by 795 days.

(21) Appl. No.: 10/806,575

(22) Filed: Mar. 22, 2004

(65) Prior Publication Data
US 2005/0232311 A1    Oct. 20, 2005

(51) Int. Cl.
*H04L 12/28* (2006.01)
(52) U.S. Cl. ............... 370/254; 370/216; 370/221; 370/258
(58) Field of Classification Search ............ 370/254, 370/258, 255, 256, 257
See application file for complete search history.

(56) References Cited

U.S. PATENT DOCUMENTS 6,600,581 B1 * 7/2003 Fatehi et al. ............ 398/9
6,657,969 B1 * 12/2003 Neuendorff et al. ........ 370/245
2003/0012142 A1 * 1/2003 Nagahama ............... 370/250

* cited by examiner

*Primary Examiner*—Firmin Backer
*Assistant Examiner*—Abdullah Riyami
(74) *Attorney, Agent, or Firm*—Townsend and Townsend and Crew LLP

(57) ABSTRACT

A method and system for processing a squelch table for optical network applications. The method includes receiving a first cross-connection entry associated with a first cross-connection and a first channel, and generating a first squelch entry associated with the first channel in a first squelch table associated with a first node. Additionally, the method includes sending a first request message associated with the first cross-connection to a second node. Moreover, the method includes if a first response message associated with the first cross-connection is received at the first node in response to the first request message within a predetermined period of time, processing information associated with the first response message and modifying the first squelch entry in response to at least information associated with the first response message.

27 Claims, 15 Drawing Sheets

AUTOMATIC UPDATE OF SQUELCH TABLES FOR OPTICAL NETWORK APPLICATIONS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

COPYRIGHT NOTICE

A portion of this application contains computer codes, which are owned by Futures Technologies, Inc. All rights have been preserved under the copyright protection, Futures Technologies, Inc. ©2004.

BACKGROUND OF THE INVENTION

The present invention relates in general to telecommunication techniques. More particularly, the invention provides a method and system including a squelch table update technique for optical networks. Merely by way of example, the invention is described as it applies to Bi-directional Line-Switched Ring (BLSR) in Synchronous Optical Network (SONET), but it should be recognized that the invention has a broader range of applicability.

Telecommunication techniques have progressed through the years. As merely an example, Synchronous Optical Network (SONET) has been used for conventional optical telecommunications for telephone applications. SONET defines a technique for transmitting multiple signals of different capacities through a synchronous, flexible, optical hierarchy. The SONET can terminate signals, multiplex signals from a lower speed to a higher speed, switch signals, and transport signals in the network according to certain definitions. Multiple SONET nodes may be interconnected into a ring structure to achieve high survivability. For example, if the SONET suffers from a connection failure at one location, the SONET can intelligently send the affected signals through one or more alternative routes without encountering the failure location. Such rerouting process is often known as automatic protection switching (APS). A Bi-directional Line-Switched Ring (BLSR) is a ring, which uses the SONET line-level status and performance parameters to initiate the APS process.

In a BLSR, a terminal is often called a node. The terminal is assigned to a node ID. The node ID identifies the SONET terminal within the BLSR. The Node IDS on a BLSR may not have consecutive values; hence the value of a Node ID usually does not imply any connectivity information but is merely the identification for a node in the ring. To represent the physical connectivity, a ring map contains a complete order of Node IDS. The ring map is usually available at each node along with a squelch table.

A squelch table includes a topological map of traffic at a specified node. For each STS channel that is terminated or passed through the specified node, the squelch table usually contains the source node ID of the incoming Synchronous Transport Signal (STS) channel and the destination node ID of the outgoing STS channel. The squelch table can be used to prevent traffic misconception in case of node failure or ring segmentation of BLSR. The squelching may be performed at the STS level or at the Virtual Tributary (VT) level.

From time to time, the squelch table at each node needs to be updated either manually or automatically. For example, when a node is removed from the ring or added to the ring, the squelch table should be updated. Some conventional protocols have been implemented to automatically update the squelch table. These conventional protocols, however, usually involve complicated mechanisms. It may take a long time to update the squelch table. Additionally, a large amount of traffic may be generated by these protocols which can lead to limited bandwidth being available for other management functions. Other limitations also exist with conventional BLSR techniques.

Hence it is highly desirable to improve squelch table update techniques for optical networks.

BRIEF SUMMARY OF THE INVENTION

The present invention relates in general to telecommunication techniques. More particularly, the invention provides a method and system including a squelch table update technique for optical networks. Merely by way of example, the invention is described as it applies to Bi-directional Line-Switched Ring (BLSR) in Synchronous Optical Network (SONET), but it should be recognized that the invention has a broader range of applicability.

According to one embodiment of the present invention, a method for processing a squelch table for optical network applications includes receiving a first cross-connection entry associated with a first cross-connection and a first channel, and generating a first squelch entry associated with the first channel in a first squelch table associated with a first node. The first squelch table is free from any squelch entry associated with the first channel other than the first squelch entry. Additionally, the method includes sending a first request message associated with the first cross-connection to a second node. The second node is a neighboring node to the first node. Moreover, the method includes if a first response message associated with the first cross-connection is received at the first node in response to the first request message within a predetermined period of time, processing information associated with the first response message and modifying the first squelch entry in response to at least information associated with the first response message.

According to yet another embodiment of the present invention, a method for processing a squelch table for optical network applications includes receiving a first request message associated with a first cross-connection and a first channel, processing information associated with the first request message and a first squelch table at a first node, and determining whether the first squelch table includes a first squelch entry associated with the first channel. Additionally, the method includes if the first squelch table is free from the first squelch entry sending a first response message, and if the first squelch table includes the first squelch entry processing information associated with the first request message. Moreover, the method includes modifying the first squelch entry in response to at least information associated with the first request message and sending a second response message associated with the first cross-connection.

According to yet another embodiment of the present invention, an apparatus for processing a squelch table for optical network applications includes a message receiver configured to receive a first request message associated with a first cross-connection and a first channel and receive a first response message associated with a second cross-connection and a second channel. Additionally, the apparatus includes a message sender configured to send a first request message associated with the second cross-connection and the second channel and send a first response message associated with the first cross-connection and the first channel. Moreover, the apparatus includes a memory system configured to store at least information associated with a first squelch table. Also, the apparatus includes a processing system coupled to the message receiver, the message sender, and the memory system. The processing system is configured to generate a first squelch entry associated with the second channel in the first squelch table, the first squelch table free from any squelch entry associated with the second channel other than the first squelch entry, process information associated with the first response message, and modify the first squelch entry in response to at least information associated with the first response message. The processing system is also configured to process information associated with the first request message and the first squelch table, determine whether the first squelch table includes a second squelch entry associated with the first channel, process information associated with the first request message, and modify the second squelch entry in response to at least information associated with the first request message.

Many benefits are achieved by way of the present invention over conventional techniques. For example, certain embodiments of the present invention operate in either manual mode or automatic mode selectively for every network node or every network ring. The internal massaging enables the network nodes on a network ring to simultaneously enter manual mode or automatic mode. Some embodiments of the present invention provide support for STS-level squelching, VT-level squelching, or both. Any mismatch of cross-connection types can be identified by certain protocols in the present invention. Certain embodiments of the present invention provides an alarm indication if any entry in the cross-connection table does not have a corresponding entry in the squelch table. Some embodiments of the present invention can initiate an update of a squelch table at any time for any specific node. Certain embodiments of the present invention can initialize a squelch table by restore the backup table from memory. Some embodiments of the present invention can perform automatic update of squelch table even under single ring failure conditions. Certain embodiments of the present invention provide an appropriate designation to indicate that a time slot is unassigned or does not have a cross-connection. Some embodiments of the present invention can allow for the in-service change of Node ID of a network node without causing a flood of messages to readjust the squelch tables. Certain embodiments of the present invention can detect mismatches in payloads through the protocol and help in diagnostic issues regarding squelching and provisions of cross-connections. Some embodiments of the present invention have the flexibility to transmit protocol messages over the overhead SONET bytes or the DCC channels. Certain embodiments of the present invention use only 32 bits to communicate a squelch entry data to the neighboring node. Some embodiments of the present invention can transport information unrelated to squelching over a BLSR ring. Certain embodiments of the present invention use scaleable and expandable protocol to cope with various BLSR rates for both STS and VT level squelching. For example, the BLSR rates may be those of OC-48, OC-192 and OC-768

Various additional objects, features and advantages of the present invention can be more fully appreciated with reference to the detailed description and accompanying drawings that follow.

BRIEF DESCRIPTION OF THE DRAWINGS

FIGS. 2A-2J are simplified methods for automatically updating squelch table according to certain embodiments of the present invention;

DETAILED DESCRIPTION OF THE INVENTION

The present invention relates in general to telecommunication techniques. More particularly, the invention provides a method and system including a squelch table update technique for optical networks. Merely by way of example, the invention is described as it applies to Bi-directional Line-Switched Ring (BLSR) in Synchronous Optical Network (SONET), but it should be recognized that the invention has a broader range of applicability.

Figure 1:
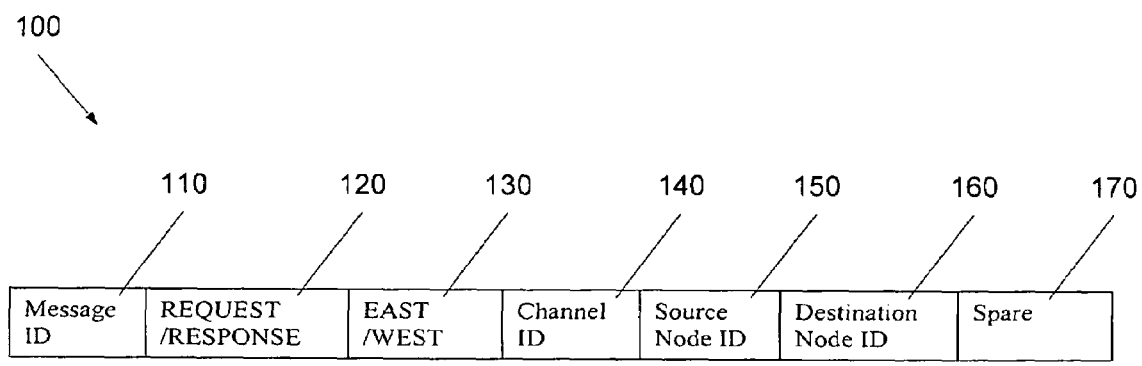
FIG. 1 is a simplified diagram for protocol message according to one embodiment of the present invention.

FIG. 1 is a simplified diagram for protocol message according to one embodiment of the present invention. The diagram is merely an example, which should not unduly limit the scope of the present invention. One of ordinary skill in the art would recognize many variations, alternatives, and modifications. In FIG. 1, a protocol message 100 includes a message ID field 110, a request/response field 120, a east/west field 130, a channel ID field 140, a source node ID field 150, a destination node ID field 160, and a spare field 170. Although the above has been shown using message fields 110, 120, 130, 140, 150, 160, and 170, there can be many alternatives, modifications, and variations. For example, the number of bits in each field may vary depending upon specific applications of the present invention. Some of the message fields may be combined. Other fields may be added to the protocol message. Depending upon the embodiment, one or more of the message fields may be removed. For example, the spare field 170 may be removed. Further details of these processes are found throughout the present specification and more particularly below.

The protocol message 100 contains information about changes of squelch table at a node from which the protocol message is sent. The protocol message 100 traverses from a sending node to its adjacent nodes through communication interfaces or an overhead channel. The protocol message 100 may support the squelching at STS level, VT level, or both. Additionally, the protocol message 100 may take the form of Protocol Data Unit (PDU).

The message ID field 110 contains information about the type of change to the squelch table at the sending node. The type of change may include one of the following: Add (AD), Drop (DR), Drop and Continue (DR&PTIN), Pass-Thru-In (PTIN), Pass-Thru-Out (PTOUT), Delete Add (DA), Delete Drop (DD), Delete Pass-Thru-Out (DPTOUT), Delete Pass-Thru-In (DPTIN), Delete Drop and Continue (DDR&PTIN), No Cross-Connection (NO), and Non-Squelch message (NS). NS indicates that a non-squelch-table type message is being sent for communicating alarm or other message information between nodes.

These types of changes may correspond to the same message ID or different message IDs. The message IDs are represented by three-bit codes as shown in Table 1. For example, both AD and POUT types of changes correspond to message ID AD and code 111. Additionally, codes 010 and 001 are not yet used and may carry other information.

TABLE 1

| Types of Changes | Message IDs | Codes |
| --- | --- | --- |
| AD/PTOUT | AD | 111 |
| DR/PTIN/DR&PTIN | DR | 110 |
| DA/DPTOUT | DA | 101 |
| DD/DPTIN/DDR&PTIN | DD | 100 |
| NO | NO | 011 |
| NS | NS | 000 |
| Not Used | | 010 |
| Not Used | | 001 |

As discussed above and further emphasized here, Table 1 is merely an example, which should not unduly limit the scope of the present invention. One of ordinary skill in the art would recognize many variations, alternatives, and modifications. For example, the message ID field may take more than three bits and assign each type of change a distinct message ID and a distinct code. As another example, the message ID field may take less than three bits and assign the same code to several types of changes.

The field 120 specifies whether the protocol message 100 is a request for information from the sending node or a response to such a request. For example, the field 120 assigns code 1 to request and code 0 to response. As another example, the field 120 takes up more than one bit. For requests, the message ID may be AD, DR, DA, DD, or NS. For Responses, the message ID may be AD, DR, NO, or NS.

The field 130 specifies the traveling direction of the protocol message 100. For example, the field 130 assigns 1 to the East direction and assigns 0 to the West direction. The request message travels in a direction opposite to the corresponding response message. For example, if a request message travels in the East direction, the response message should travel in the West direction. When the protocol message 100 cannot traverse in the intended direction, the protocol message 100 may be rerouted to the other direction. The intermediate nodes would pass through this message based on the inconsistency between the direction indicated in the field 130 and the direction in which the message in fact travels.

The field 140 specifies the STS channel number corresponding to the processed squelch table. For example, the field 140 takes up 10 bits and accommodate an OF768 4-Fiber BLSR ring. The field 150 contains information related to the source node ID of a traffic connection. For example, the field 150 is five-bit long, among which four bits provide the source node ID. The fifth bit indicates whether the protocol message 100 contains a valid source node ID. For certain message ID such as PT, the source Node ID is unknown. Hence if the fifth bit is set to 1, the source node ID in the other four bits are ignored.

The field 160 contains information related to the destination node ID of a traffic connection. For example, the field 150 is five-bit long, among which four bits provide the destination node ID. The fifth bit indicates whether the protocol message 100 contains a valid destination node ID. For certain message ID such as PT, the destination Node ID is unknown. Hence if the fifth bit is set to 1, the destination node ID in the other four bits are ignored.

The messages for DR, PTIN and DR&PTIN have the same message ID but different destination node IDS. Whenever there is a PTIN connection, the node sending the protocol message is not the destination node and the destination node ID does not equal the node ID sending the message. If the destination drop cross-connection is not provisioned, the destination node ID is ignored as indicated by the 5th bit of the field 160.

The field 170 may contain optional information. For example, the field 170 may provide a VT identification for VT squelching and indicate VT-Access capability. As another example, the field 170 provides an indication of STS path concatenation level. As yet another example, the field 170 provides a check-sum to check the data contained in the protocol message 100. The check sum is for example useful when the squelch tables are updated using hardware logic and the protocol message is transported over Line/Section layer overhead bytes. As yet another example, the field 170 carries any information unrelated to squelching.

Figure 2:
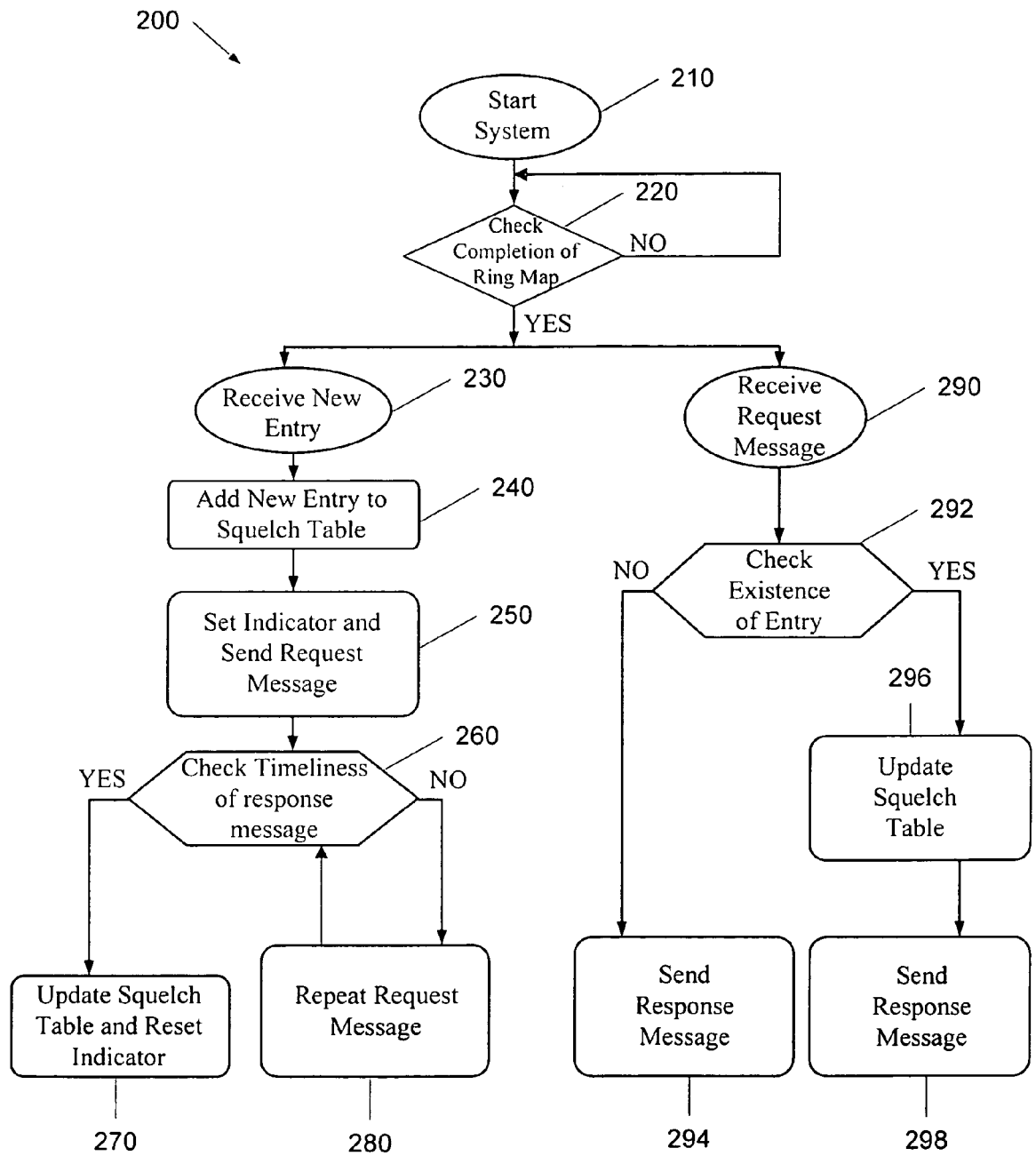
FIG. 2 is a simplified method for automatically updating squelch table according to an embodiment of the present invention.

FIG. 2 is a simplified method for automatically updating squelch table according to an embodiment of the present invention. This diagram is merely an example, which should not unduly limit the scope of the claims. One of ordinary skill in the art would recognize many variations, alternatives, and modifications. The method 200 includes a process 210 for starting system, a process 220 for checking completion of ring map, a process 230 for receiving new entry, a process 240 for adding new entry to squelch table, a process 250 for setting indicator and sending request message, a process 260 for checking timeliness of response message, a process 270 for updating squelch table and resetting indicator, a process 280 for repeating request message, a process 290 for receiving request message, a process 292 for checking existence of entry, a process 294 for sending response message, a process 296 for updating squelch table, and a process 298 for sending response message. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with others replaced. For example, the process 210 for starting system is skipped. As another example, the process 220 for checking completion of ring map is skipped. Further details of these processes are found throughout the present specification and more particularly below.

At the process 210, the hardware and software system is started at a network node. The process 210 can be skipped if the hardware and software system is already running. At the process 220, the completion of a ring map is verified. For example, a ring map stored at the network node contains a complete order of Node IDS in a BLSR ring. If the ring map is not completed, the process 220 would be repeated. If the ring map is completed, the process 230 is performed or the process 290 is performed. In another example, both processes 230 and 290 are performed.

At the process 230, a new cross-connection entry is received at the network node. For example, the new entry is a provision or a deletion of one of following cross-connections: AD, DR, DR&PTIN, PTIN, POUT, DA, DD, DPTOUT, DPTIN, or DDR&PTIN. The new entry corresponds to a specific STS channel or a VT channel. For the STS or VT channel, the squelch table does not have a pre-existing entry.

At the process 240, the new cross-connection entry is added to a squelch table at the network node. If the new entry is a provision of a cross-connection, the cross-connection is entered into the squelch table. If the new entry is a deletion of a cross-connection, the cross-connection is deleted from the squelch table. When a squelch table does not contain a specific cross-connection, or a valid source node ID or a destination node ID for the specific cross-connection, the entry associated with the specific cross-connection is not available when the user retrieves the squelch table. Consequently, the squelch entry does not exist for the associated STS or VT.

At the process 250, an indicator is set to show the cross-section entry entered into the squelch table is new. For example, the indicator is a flag in a software program related to the squelch table. Additionally, a request message is sent from the network node. For example, the request message may be the protocol message 100 requesting information. In another example, the intended recipient of the request message is one or both neighboring nodes of the sending node in a BLSR ring. The request message may be carried over the fixed overhead on the SONET line or section, such as unused D-bytes. In another example, the request message is carried over the section or line DCC channels, in which case the proper DC associations should be established for the request message.

Also at the process 250, a response clock is started to measure the time period from sending the request message to receiving a response message. As discussed above and further emphasized here, there can be many alternatives, modifications, and variations. For example, one or two of the above three processes, i.e., setting indicator, sending request message and starting clock, are skipped.

At the process 260, whether a response message is timely received is checked. If a response message is received within a predetermined time period based on measurements of the response clock, the response message is considered timely. If the response message is not received within the predetermined time period, the process 280 is performed. For example, the response message is received from a network node receiving the request message sent in the process 250.

At the process 270, the squelch table is updated using the information from the response message. For example, the information in the response message is translated corresponding to the new entry in the squelch table. The translation to the new entry can be performed with software or hardware. For example, an FPGA system extracts the information in the response message carried over the overhead. Additionally, the indicator is reset to show that the cross-connection is old.

At the process 280, a request message is resent if the request message has not been resent for over a predetermined number of times. Subsequently the process 260 is repeated. If the request message has been sent for over a predetermined number of times, an alarm message indicating response failure is sent to the management system. For example, the management system facilitates the operation of a BLSR ring. The alarm message indicates a squelch table response processing failure.

At the process 290, a request message for a cross-connection is received. The cross-connection may be added, deleted, or edited. For example, the request message may be the protocol message 100 requesting information. In another example, the sender of the request message is a neighboring node of the receiving node in a BLSR ring. At the process 292, the existence of the cross-connection in the squelch table is checked. If the squelch table at the receiving node contains the cross-connection, the process 294 is performed. If the squelch table at the receiving node does not contain the cross-connection, the processes 296 and 298 are performed.

At the process 294, a response message is sent to the node sending the request message. For example, the request message may be the protocol message 100 with the message ID field indicating No Cross-Connection (NO). The response message may be carried over the fixed overhead on the SONET line or section, such as unused D-bytes. In another example, the response message is carried over the section or line DCC channels, in which case the proper DC associations should be established for the response message.

At the process 296, the squelch table at the receiving node is updated based on information in the request message. At the process 298, a response message is sent to the node sending the request message. The response message contains information about the cross-connection related to the request message. The information may enable the node sending the request message to update its squelch table.

As discussed above and further emphasized here, FIG. 2 is merely an example. For example, the method 200 may be modified according to FIGS. 2A through 2J. FIGS. 2A-2J are simplified methods for automatically updating squelch table according to certain embodiments of the present invention. These diagram are merely examples, which should not unduly limit the scope of the claims. One of ordinary skill in the art would recognize many variations, alternatives, and modifications. In FIGS. 2A-2J, "SRC" represents source node ID, "DST" represents destination node ID, "Node ID" represents the node ID of the network node to whose squelch table AD, DR, or PT is being added, "X" represents unknown, "E" represents east side of the network node, and "W" represents west side of the network node. "PT" includes both PTIN and POUT.

Figure 2A:
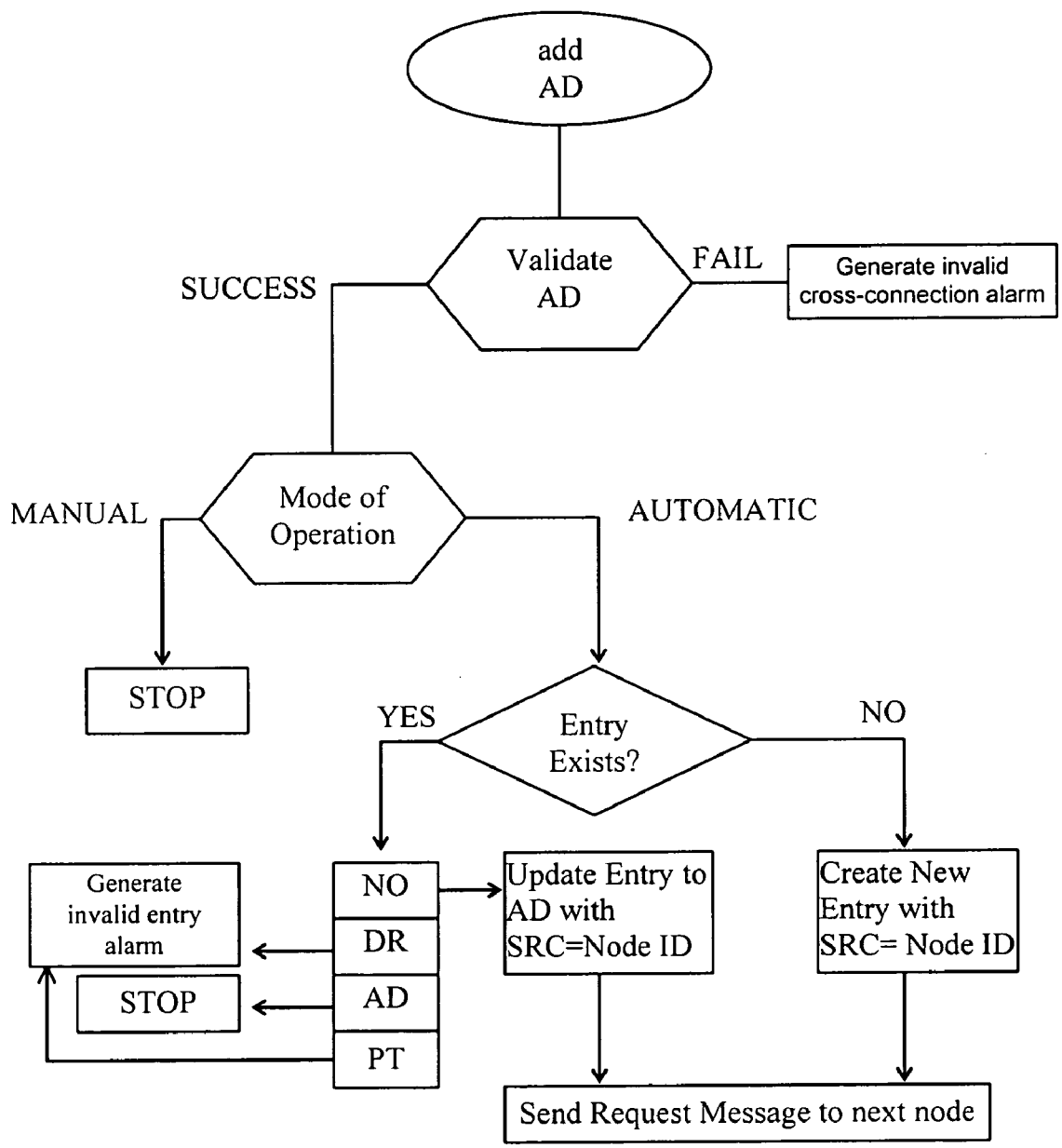
Figure 2B:
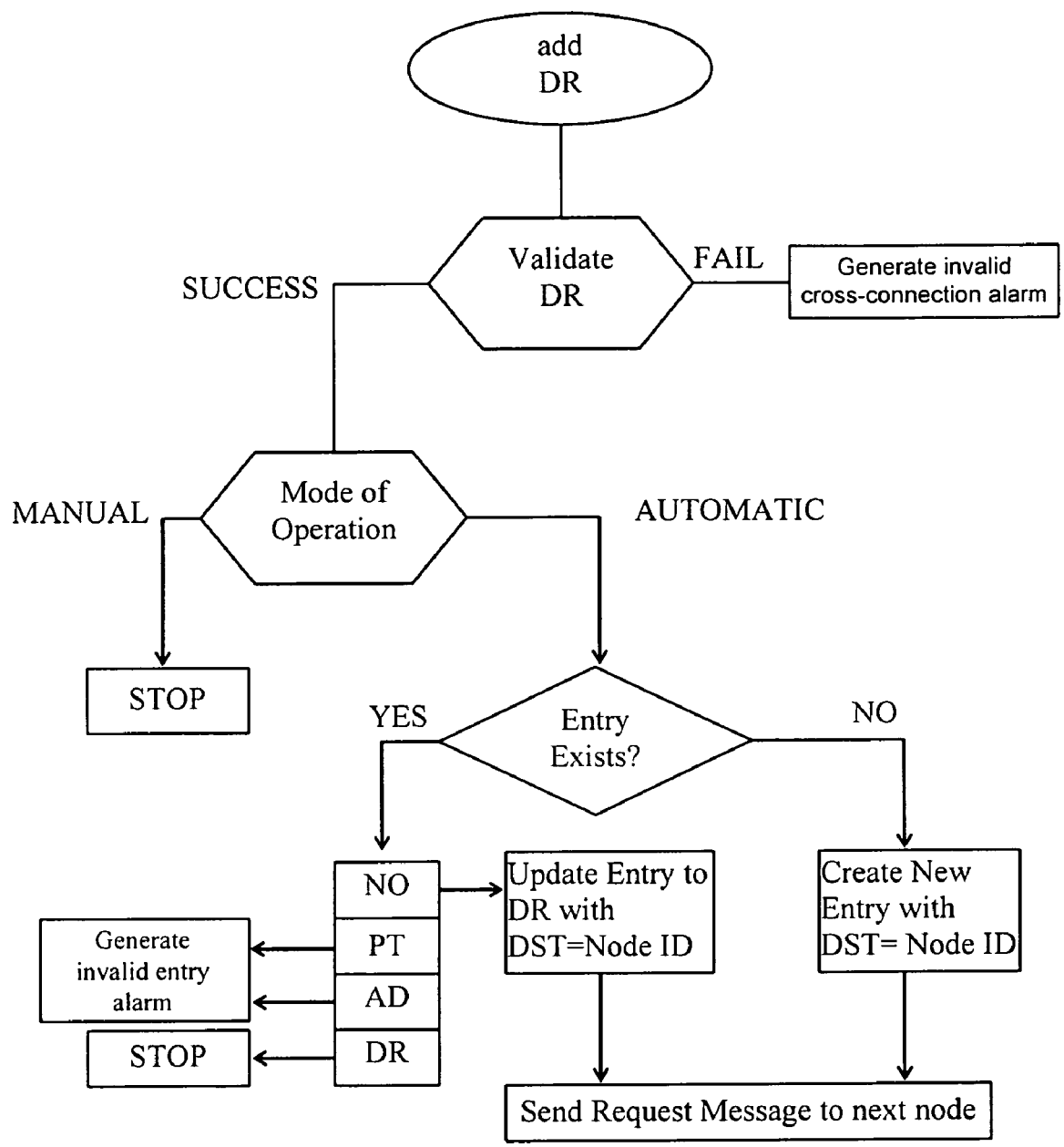
Figure 2C:
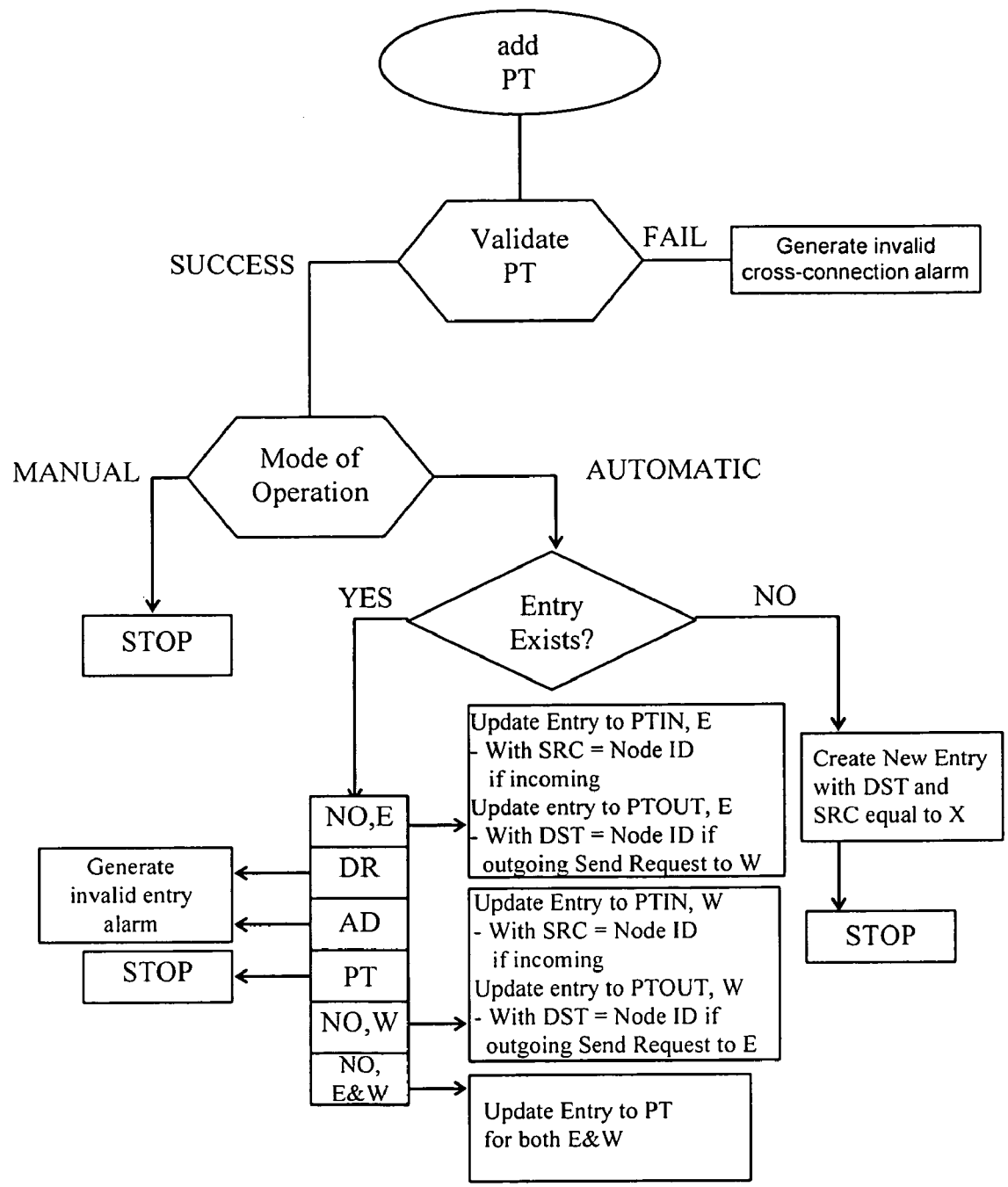

FIGS. 2A, 2B and 2C describe methods for adding cross-connections AD, DR and PT respectively. Each cross-connection undergoes a validation process by checking whether the cross-connection is allowed in the cross-connection table. If the cross-connection is not allowed, an alarm message indicating invalid cross-connection is sent to the management system. If the cross-connection is allowed, the mode of operation is determined. If the mode of operation is manual, the automatic update stops. If the mode of operation is automatic, the automatic update continues. Next, whether an entry already exists is checked for the STS or VT to which AD, DR, or PT is being added. If the entry does not exist, an entry is created in the squelch table. A request message is sent or the automatic update is completed. If the entry already exists, the type of the existing entry is determined. If the existing entry corresponds to NO at E or NO at W, the entry is updated and a request message is sent. If the existing entry corresponds to NO at both E and W, the entry is updated. If the existing entry corresponds to a cross-connection other than NO and the cross-connection being added, an alarm message indicating invalid entry is sent to the management system. If the existing entry corresponds to a cross-connection being added, the automatic update completes.

Figure 2D:
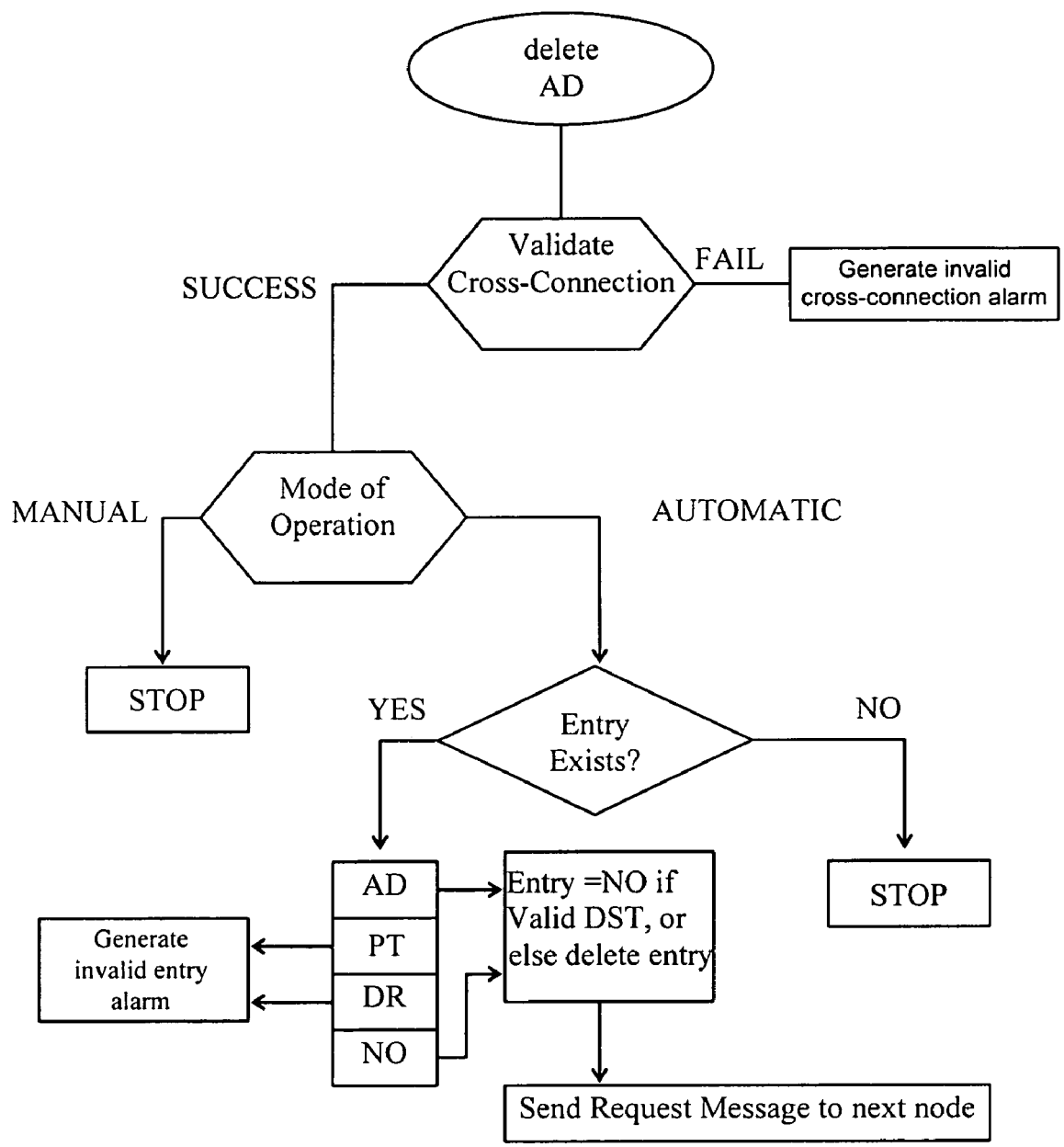
Figure 2E:
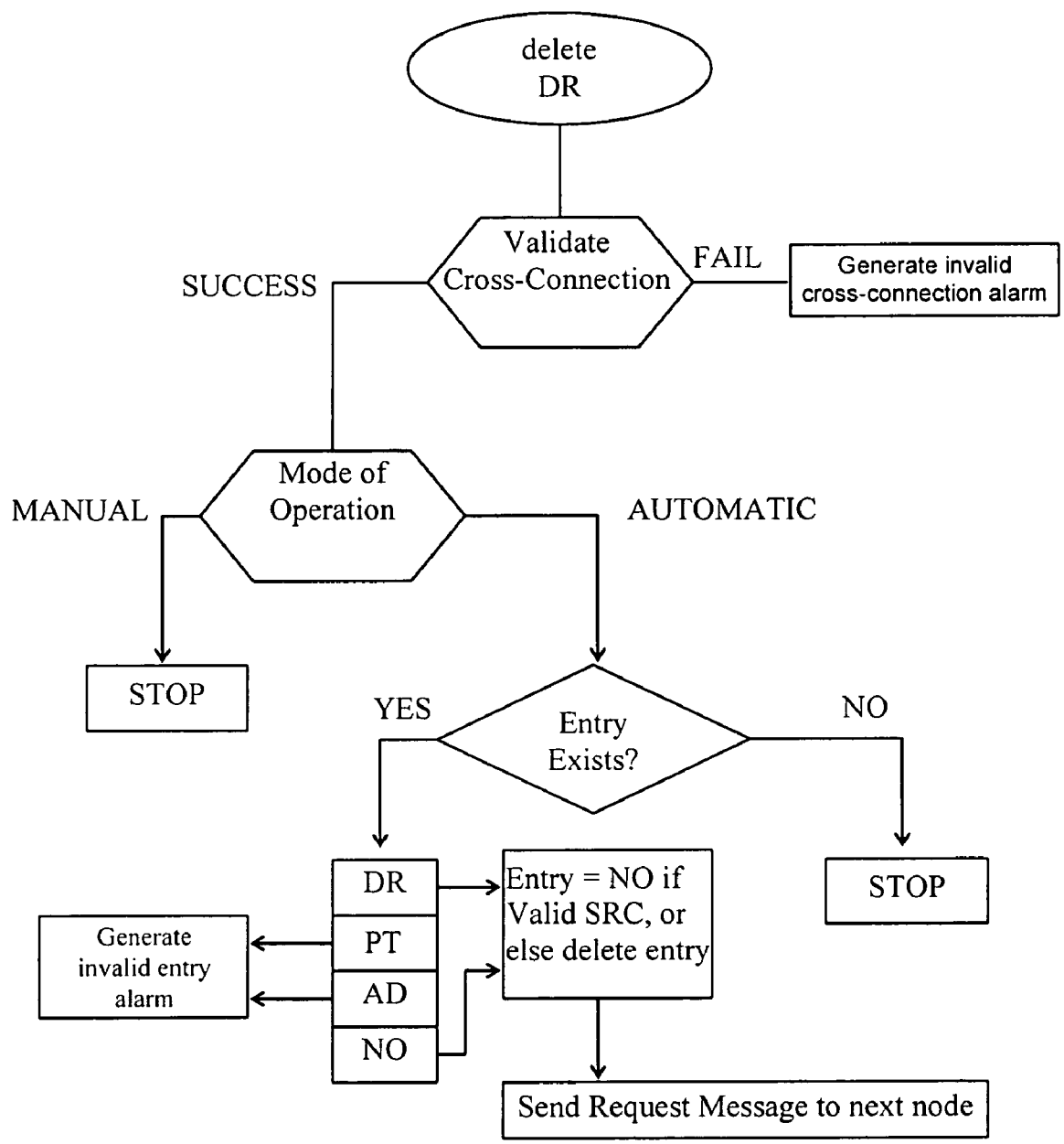
Figure 2F:
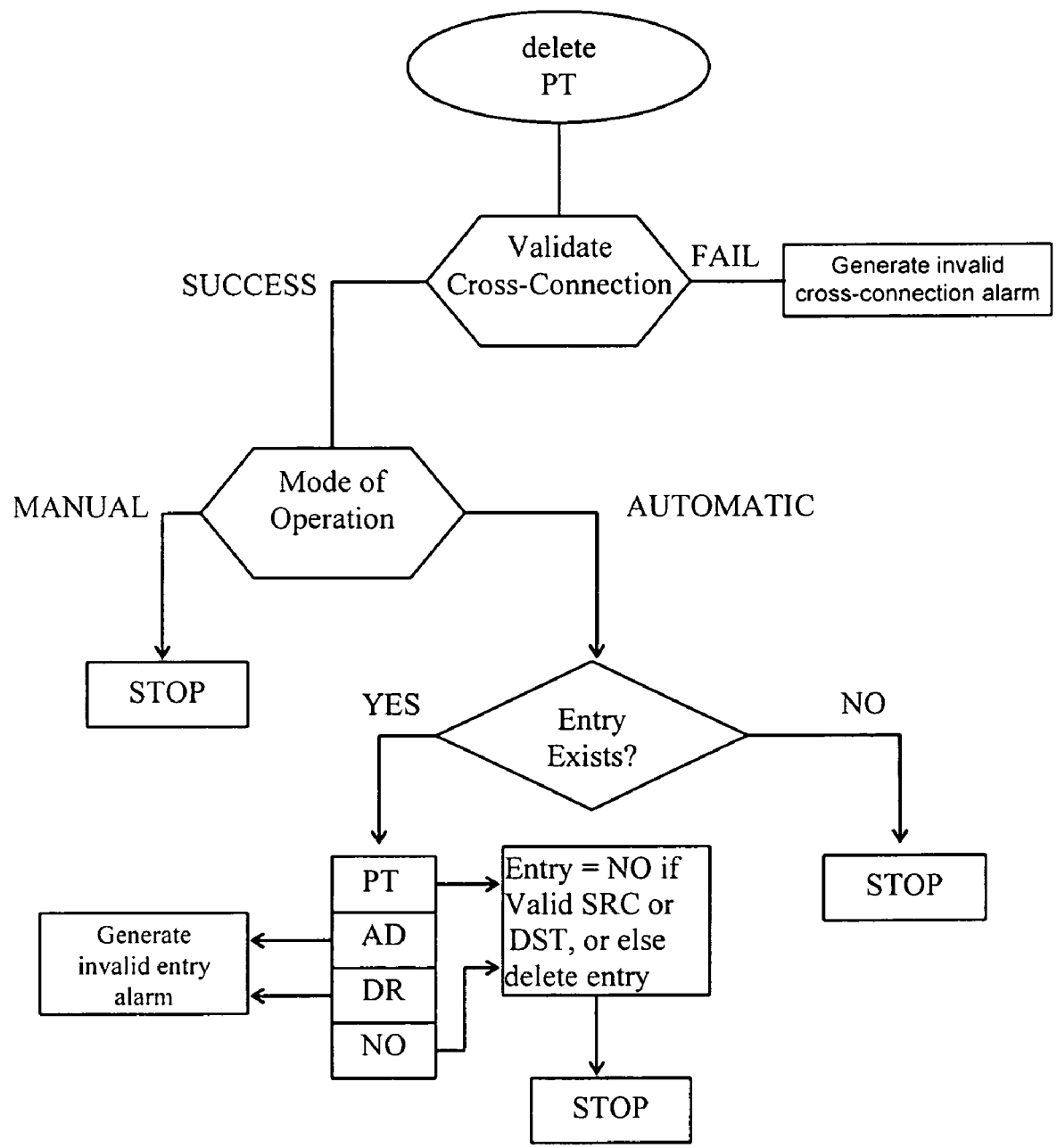

FIGS. 2D, 2E and 2F describe methods for deleting cross-connections AD, DR and PT respectively. PT includes PTIN and POUT. Each cross-connection undergoes a validation process by checking whether the cross-connection is allowed in the cross-connection table. If the cross-connection is not allowed, an alarm message indicating invalid cross-connection is sent to the management system. If the cross-connection is allowed, the mode of operation is determined. If the mode of operation is manual, the automatic update stops. If the mode of operation is automatic, the automatic update continues. Next, whether an entry already exists is checked for the STS or VT from which AD, DR, or PT is being deleted. If the entry does not exist, the automatic update is completed. If the entry already exists, the type of the existing entry is determined. If the existing entry corresponds to NO or a cross-connection being deleted, the squelch table is updated. The request message is sent, or the automatic update is completed. If the existing entry corresponds to a cross-connection other than NO and the cross-connection being deleted, an alarm message indicating invalid entry is sent to the management system. In FIGS. 2D, 2E and 2F, the validity of the source node ID or the destination node ID may be determined by the fifth bit as described for the fields 150 and 160 in FIG. 1.

Figure 2G:
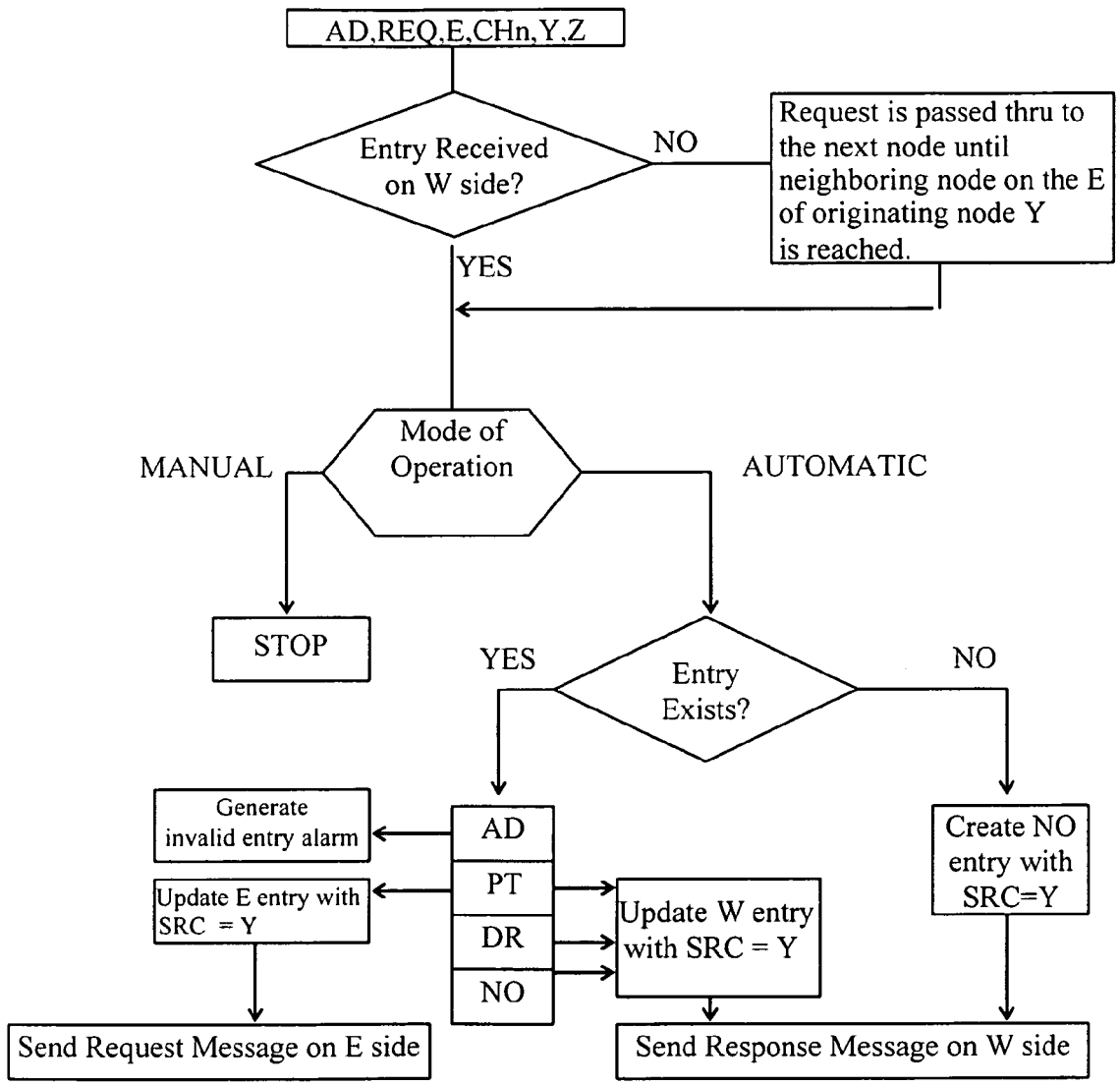
Figure 2H:
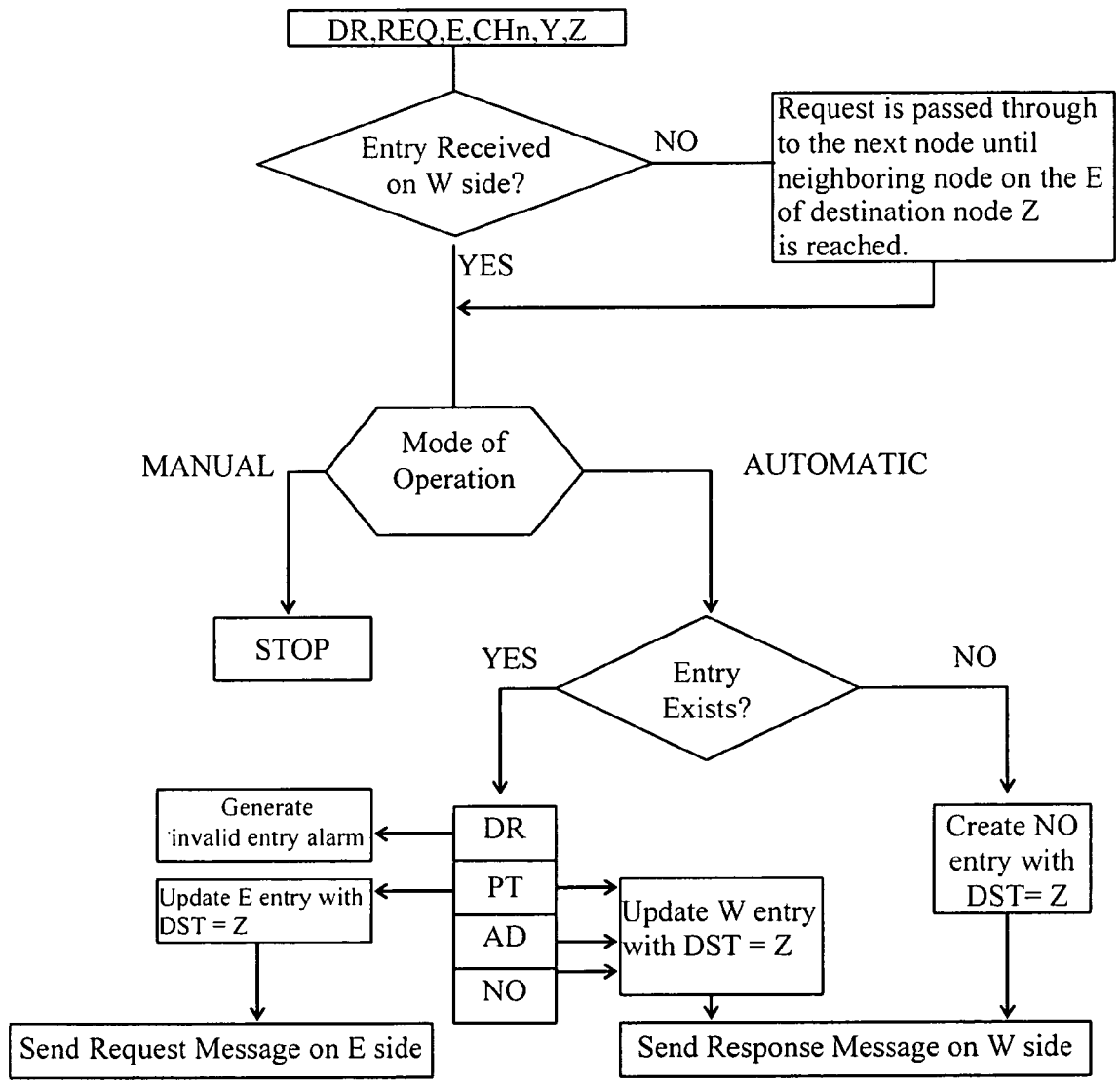
Figure 21:
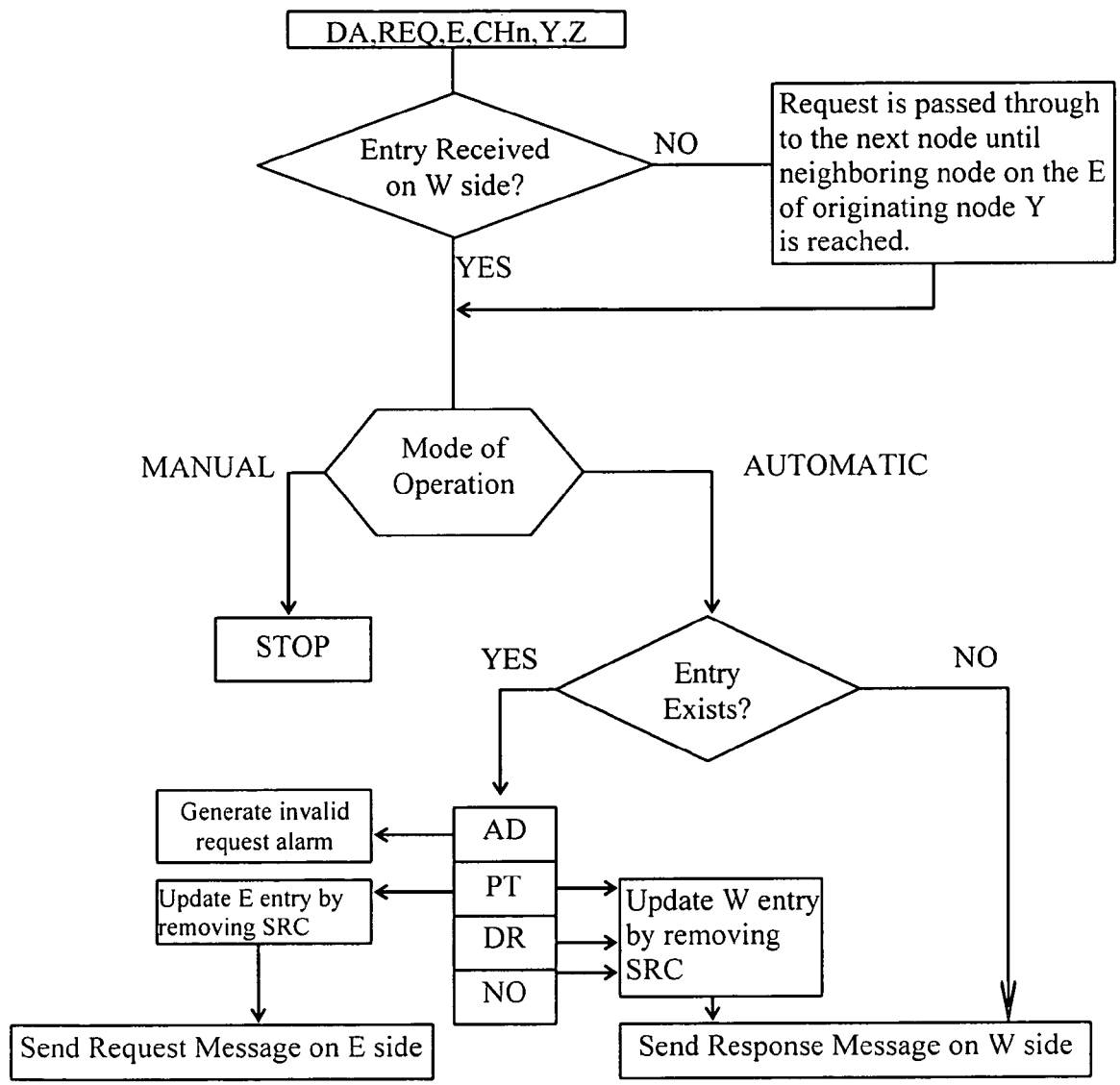

FIGS. 2G and 2H describe methods for processing request message for adding cross-connections AD and DR respectively. For example, the request message is sent from the East side of the network node where the request message is originated. Whether the request message is received at the West side is then determined. If the request message is not received at the West side, the request message is passed through to the next node until the neighboring node on the East side of the originating or destination node is reached. If the neighboring node has been reached or the request message is received at the West side, the mode of operation is determined. If the mode of operation is manual, the automatic update stops. If the mode of operation is automatic, the automatic update continues. Next, whether an entry already exists is checked for the STS or VT to which AD or DR is being added. If the entry does not exist, an entry for NO cross-connection is created with either the source node ID or the destination node ID specified. A response message is sent from the West side. If the entry already exists, the type of the existing entry is determined. If the existing entry corresponds to the cross-connection being added, an alarm message indicating invalid entry is sent to the management system. If the existing entry corresponds to a PT cross-connection, both the entries for the East side and the West side are updated, and a request message is each sent from the East side and the West side. If the existing entry corresponds to a NO cross-section or a cross-section other than PT and the cross-connection being added, the entry on the West side is updated and a response message is sent from the West side.

Figure 2J:
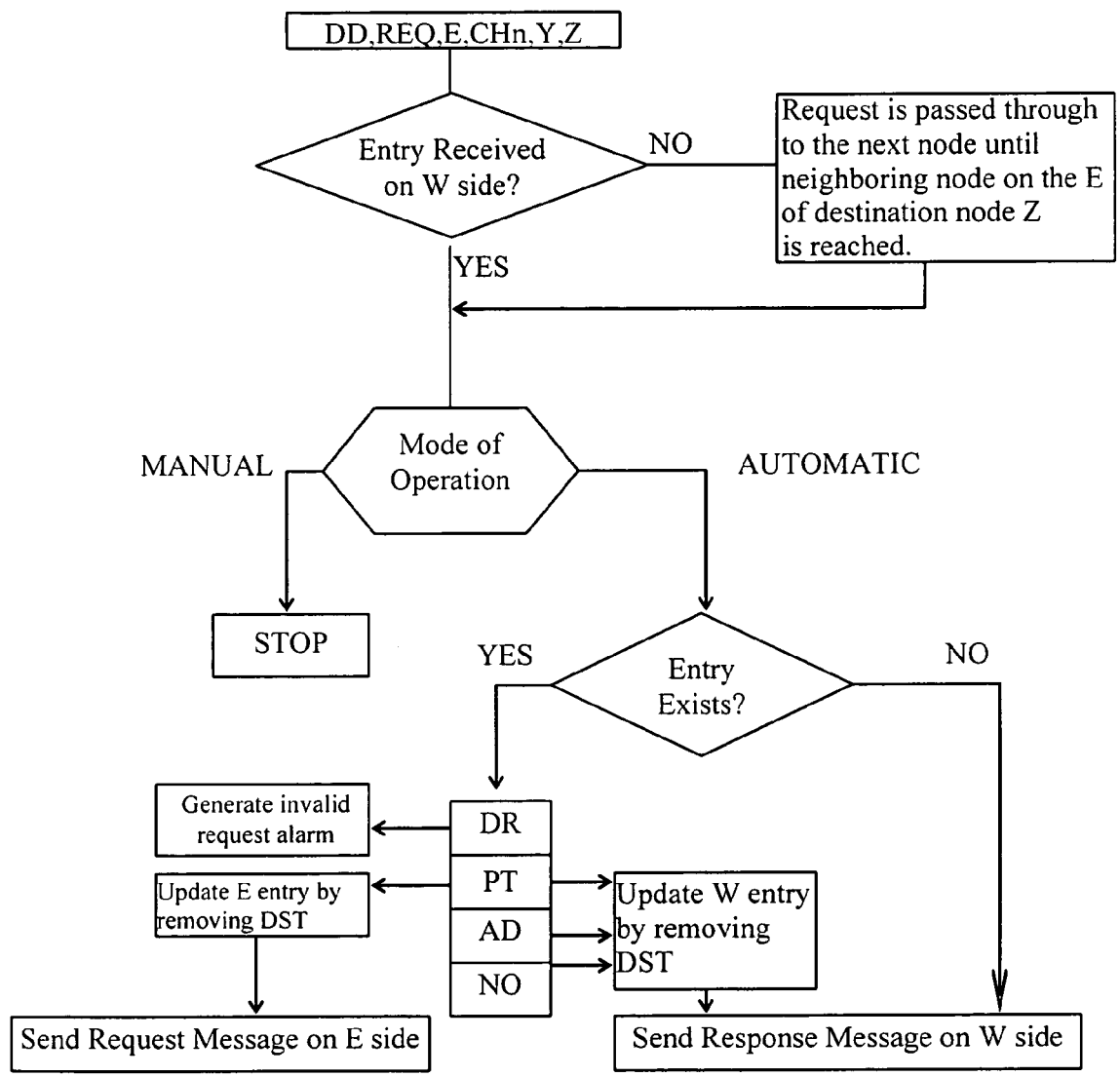

FIGS. 2I and 2J describe methods for processing request message for deleting cross-connections AD and DR respectively. For example, the request message is sent from the East side of the network node where the request message is originated. Whether the request message is received at the West side is then determined. If the request message is not received at the West side, the request message is passed through to the next node until the neighboring node on the East side of the originating or destination node is reached. If the neighboring node has been reached or the request message is received at the West side, the mode of operation is determined. If the mode of operation is manual, the automatic update stops. If the mode of operation is automatic, the automatic update continues. Next, whether an entry already exists is checked for the STS or VT from which AD or DR is being deleted. If the entry does not exist, a response message is sent from the West side. If the entry already exists, the type of the existing entry is determined. If the existing entry corresponds to AD or DR in FIG. 2I or 2J respectively, an alarm message indicating invalid request is sent to the management system. If the existing entry corresponds to a PT cross-connection, both the entries for the East side and the West side are updated, and a request message is each sent from the East side and the West side. If the existing entry corresponds to a NO cross-section or a cross-section other than PT and AD or DR in FIG. 2I or 2J respectively, the entry on the West side is updated and a response message is sent from the West side.

As discussed above and further emphasized here, FIGS. 2 and 2A-2J are merely examples, which should not unduly limit the scope of the claims. One of ordinary skill in the art would recognize many variations, alternatives, and modifications. For example, the methods of FIGS. 2 and 2A-2J can update and/or create a squelch table. In another example, the method 200 can update a preexisting entry in a squelch table or create a new entry in the squelch table.

Each network node generates its squelch table by sending request messages and receiving response messages for each cross-connection added to or removed from the squelch table. For example, this process is usually performed for all new cross-connections when a network node is initialized or at system start-up. In another example, the process modifies the squelch tables in the neighboring nodes, which in turn send messages to their neighbors until all the squelch tables in the BLSR ring are updated. In yet another example, at node initialization the squelch tables are restored from non-volatile memory. The following is an exemplary memory record of a squelch table:

```
class CSquelchTbRecord
{
private:
    //BIT6-7:represent the incoming cross-connect type: NO/
    /DR/PTIN/DR&PTIN
    //BIT5:represent whether the response PDU is received.
    //BIT0-4:represent the incoming SRC node ID (BIT4 =1 if the SRC
    is unknown)
    BYTE m_byIncoming;
    //BIT6-7:represent the outgoing cross-connect type: NO//AD/PTOUT
    //BIT5:represent whether the response PDU is received.
    //BIT0-4:represent the outgoing DST node ID (BIT 4 =1 if the DST
    is unknown)
    BYTE m_byOutgoing;
    BOOL m_bSrcVtAccess; //Reserved for future if support vt squelch
    BOOL m_bDstVtAccess; //Reserved for future if support vt squelch
    void *m_pVtAccess; //Reserved for future if support Vt squelch
. . .
};
CSquelchTbRecord m_SquelchTb1 [2][192]; //Squelch Table
```

It is important to fast update squelch tables. For example, the hardware processing of protocol messages may achieve a response time of less than 10 ms from the adjacent network node. For a BLSR ring of 16 nodes, the update time could last for 160 ms. If the DCC channels are used, the update may take much longer than 160 ms. The DC is common medium that carries traffic messages for different applications. To shorten the update time, certain mechanisms can be implemented to advance the priority of the protocol messages with respect to other messages over the DCC channels.

Figure 3:
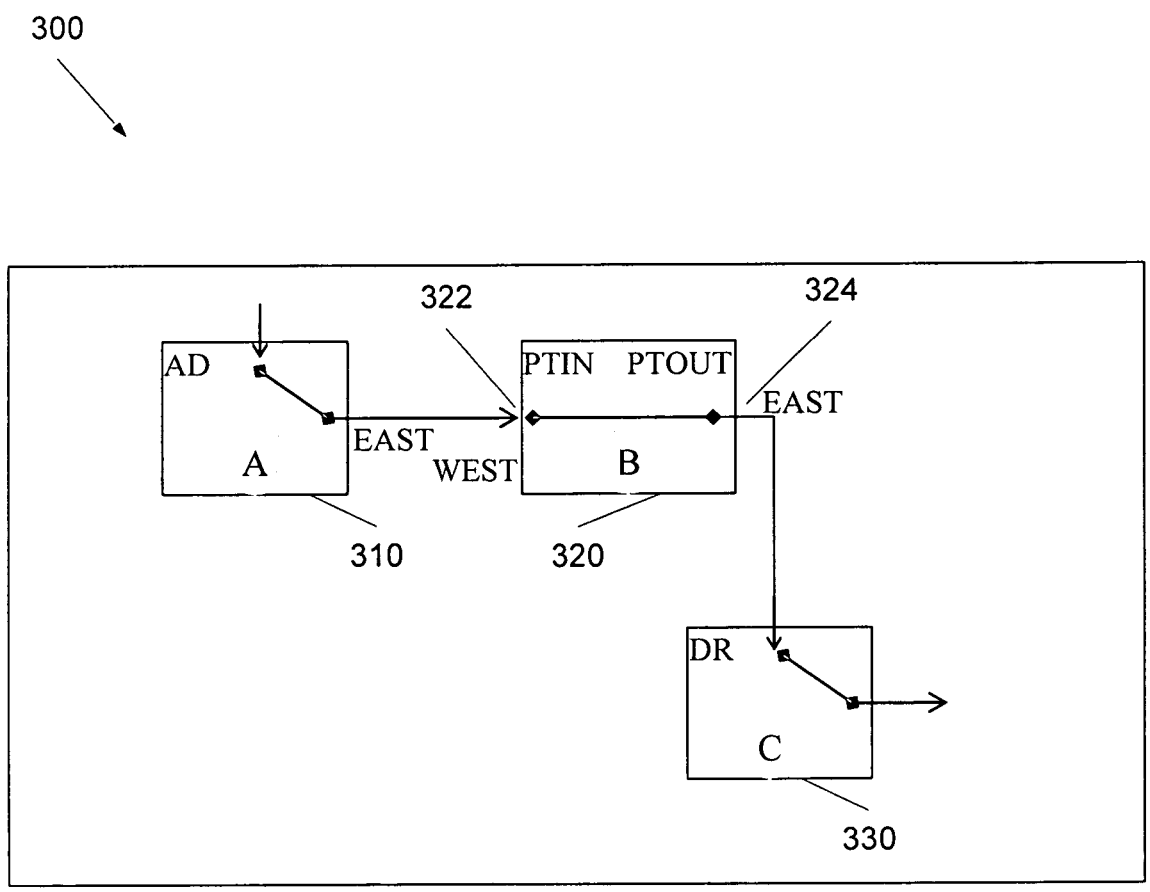
FIG. 3 illustrates simplified cross-connections between two network nodes according to one embodiment of the present invention.

FIG. 3 illustrates simplified cross-connections between two network nodes according to one embodiment of the present invention. This diagram is merely an example, which should not unduly limit the scope of the claims. One of ordinary skill in the art would recognize many variations, alternatives, and modifications. The cross-connections 300 go through nodes 310, 320 and 330 representing nodes A, B and C respectively. The cross-connections 300 include adding a signal to the node 310, passing through the signal into a West terminal 322 of the node 320, passing through the signal out of the East terminal 324 of the node 320, and dropping the signal at the node 330. Although the above has been shown using a selected sequence of unidirectional cross-connections, there can be many alternatives, modifications, and variations. For example, some of the cross-connections may be expanded and/or combined. Other processes may be inserted to those noted above. Depending upon the embodiment, the specific sequence of cross-connections may be interchanged with others replaced. Further details of these processes are found throughout the present specification and more particularly below.

The cross-sections illustrated in FIG. 3 are summarized in Table 2. As shown in Table 2, Node A adds a new entry for AD, Node B adds a new entry for POUT at East and a new entry for PTIN at West, and Node C adds a new entry for DR in their respective squelch table.

may contain additional information. Also, Node B sends a request message 424 to Node C. For example, the request message 424 takes the same format as the protocol message 100. The message ID field is set to POUT, the request/response field is set to request, the east/west field is set to east, the channel ID field is set to channel 1, the source node ID field is set of Node A, and the destination node ID field is set to unknown. The spare field may contain additional information.

Node C receives the request message 424 and edits its squelch table. The entry for DR is assumed to have a source node ID of Node A. Additionally, Node B sends a response message 430 to Node B. For example, the response message 420 takes the same format as the protocol message 100. The message ID field is set to DR, the request/response field is set to response, the east/west field is set to west, the channel ID field is set to channel 1, the source node ID field is set of Node A, and the destination node ID field is set to A. The spare field may contain additional information. Also, Node C sends a request message 434 to Node B. For example, the request message 434 takes the same format as the protocol message 100. The message ID field is set to DR, the request/response field is set to request, the east/west field is set to west, the channel ID field is set to channel 1, the source node ID field is set of Node A, and the destination node ID field is set to C. The spare field may contain additional information.

TABLE 2

| | East | | | | West | | | | |
|---|---|---|---|---|---|---|---|---|---|
| | in DR | PTIN | DR&PTIN | out AD | PTOUT | in DR | PTIN | DR&PTIN | out AD | PTOUT |
| A | | | | ✓ | | | | | | |
| B | | | | | ✓ | | | ✓ | | |
| C | | | | | | | ✓ | | | |

Figure 4:
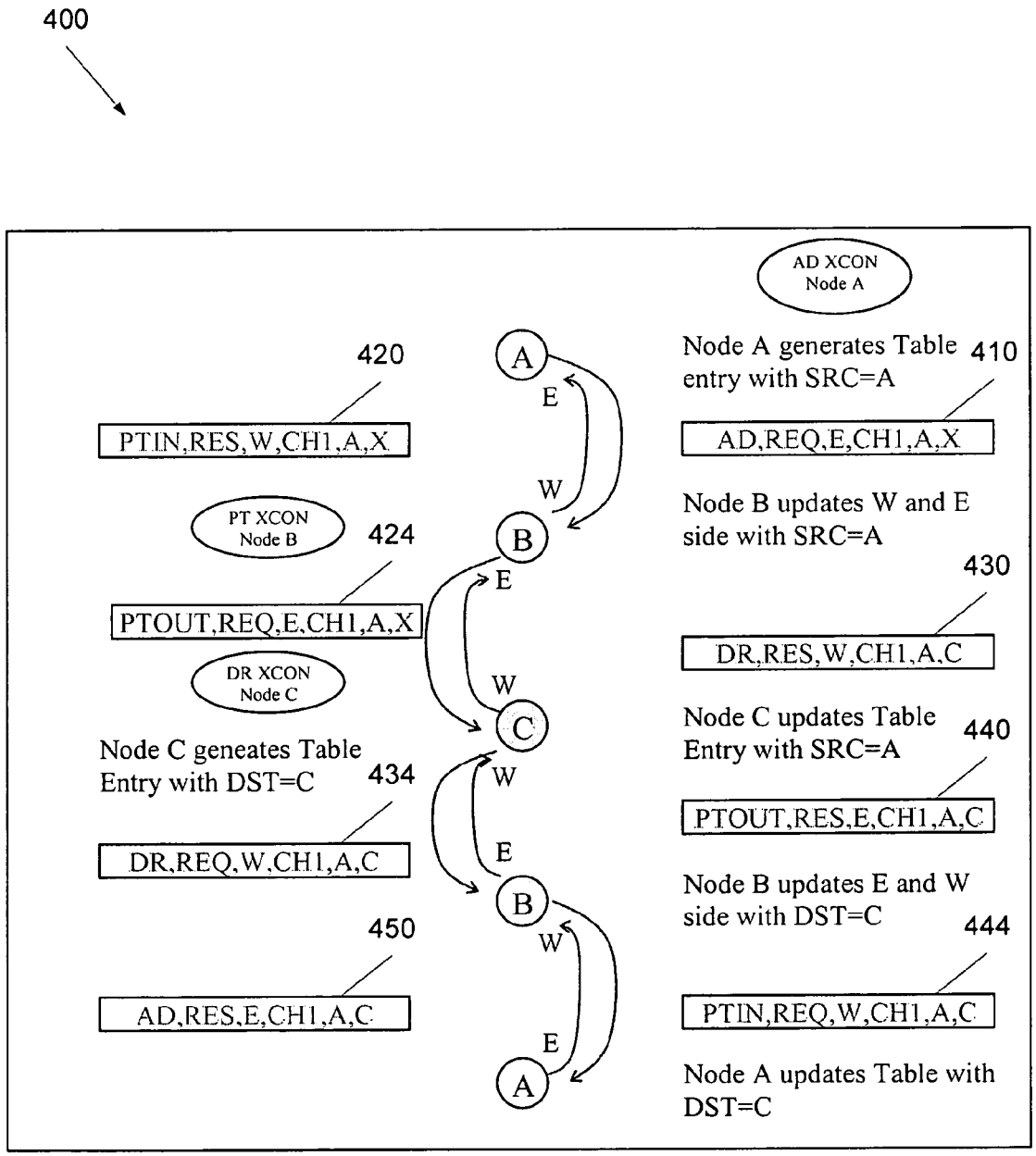
FIG. 4 is a simplified method for implementing cross-connections in squelch tables according to an embodiment of the present invention.

FIG. 4 is a simplified method for implementing cross-connections in squelch tables according to an embodiment of the present invention. This diagram is merely an example, which should not unduly limit the scope of the claims. One of ordinary skill in the art would recognize many variations, alternatives, and modifications. For example, the method 400 uses the method 200 as discussed above.

Node A adds an AD entry to its squelch table. It is assumed that the entry has a source node ID of Node A. Node A sends a request message 410 to Node B. For example, the request message 410 takes the same format as the protocol message 100. The message ID field is set to AD, the request/response field is set to request, the east/west field is set to east, the channel ID field is set to channel 1, the source node ID field is set of Node A, and the destination node ID field is set to unknown. The spare field may contain additional information.

Node B receives the request message 410 and edit its squelch table. The entry for PT on both west and east sides are updated by setting the source node to Node A. Additionally, Node B sends a response message 420 to Node A. For example, the response message 420 takes the same format as the protocol message 100. The message ID field is set to PTIN, the request/response field is set to response, the east/west field is set to west, the channel ID field is set to channel 1, the source node ID field is set of Node A, and the destination node ID field is set to unknown. The spare field Node B receives the request message 434 and edit its squelch table. The entry for PT on both west and east sides are updated by setting the destination node to Node C. Additionally, Node B sends a response message 440 to Node C. For example, the response message 440 takes the same format as the protocol message 100. The message ID field is set to POUT, the request/response field is set to response, the east/west field is set to east, the channel ID field is set to channel 1, the source node ID field is set of Node A, and the destination node ID field is set to C. The spare field may contain additional information. Also, Node B sends a request message 444 to Node A. For example, the request message 444 takes the same format as the protocol message 100. The message ID field is set to PTIN, the request/response field is set to request, the east/west field is set to west, the channel ID field is set to channel 1, the source node ID field is set of Node A, and the destination node ID field is set to Node C. The spare field may contain additional information.

Node A receives the request message 444 and edit its squelch table. The entry for AD are updated by setting the destination node to Node C. Additionally, Node B sends a response message 500 to Node B. For example, the response message 500 takes the same format as the protocol message 100. The message ID field is set to AD, the request/response field is set to response, the east/west field is set to east, the channel ID field is set to channel 1, the source node ID field is set of Node A, and the destination node ID field is set to C. The spare field may contain additional information.

After the message exchange and processing are completed, the squelch table entries for Nodes A, B and C are shown in Table 3. "Src" represents source node ID, "Dest" represents destination node ID.

TABLE 3

| Node | East | | | | West | | | |
|---|---|---|---|---|---|---|---|---|
| | Incoming | | Outgoing | | Incoming | | Outgoing | |
| | Src | Vt-acc | Vt-acc | Dest | Src | Vt-acc | Vt-acc | Dest |
| A | | | x | C | | | | |
| B | | | x | C | A | x | | |
| C | | | | | A | x | | |

As discussed above and further emphasized here, FIG. 4 is merely an example, which should not unduly limit the scope of the present invention. One of ordinary skill in the art would recognize many variations, alternatives, and modifications. For example, the message ID fields for the messages 420 and 444 are changed to DR, and the message ID fields for the messages 430 and 434 are changed to PTIN. In another example, the message ID fields for the messages 424 and 440 are changed to AD, and the message ID fields for the messages 410 and 450 are changed to POUT.

Figure 5:
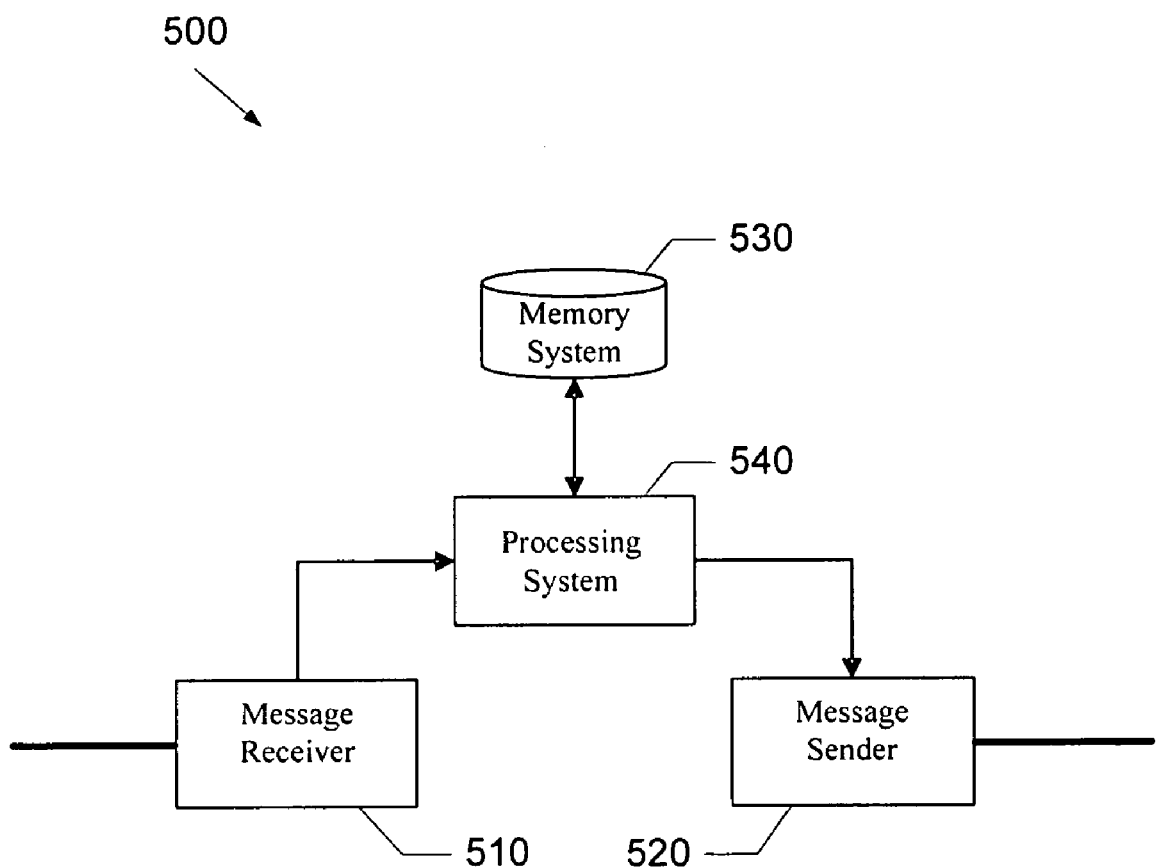
FIG. 5 is a simplified apparatus for automatically updating squelch table according to an embodiment of the present invention.

FIG. 5 is a simplified apparatus for automatically updating squelch table according to an embodiment of the present invention. This diagram is merely an example, which should not unduly limit the scope of the claims. One of ordinary skill in the art would recognize many variations, alternatives, and modifications. The apparatus 500 includes a message receiver 510, a message sender 520, a memory system 530, and a processing system 540. Although the above has been shown using the systems 510, 520, 530, and 540, there can be many alternatives, modifications, and variations. For example, the memory system 530 and the processing system 540 may be combined. The processing system 540 may be expanded to include its own memory system. Other systems may be added to those noted above. Depending upon the embodiment, the specific arrangement of systems may be interchanged with others replaced. Further details of these systems found throughout the present specification and more particularly below.

The message receiver 510 receives a request message and/or a response message, the message sender 520 sends a request message and/or a response message, and the memory system 530 stores a squelch table and/or a cross-connection table. The processing system 540 processes the received request message and/or the received response message, and generates the sent request message and/or the sent response message. Additionally, the processing system processes information related to any cross-connection entry and information associated with the squelch table and/or the cross-connection table.

For example, each node of a BLSR has an apparatus substantially similar to the apparatus 500. The message receiver 510 is configured to receive some or all messages related to FIGS. 1, 2, 2A-2J, 3, and 4. The message sender 520 is configured to send some or all messages related to FIGS. 1, 2, 2A-2J, 3, and 4. The processing system 540 is configured to perform some or all processes related to FIGS. 1, 2, 2A-2J, 3, and 4. These processes may be performed with software, hardware, or combination thereof.

According to another embodiment of the present invention, an apparatus for processing a squelch table for optical network applications includes a message receiver configured to receive a first request message associated with a first cross-connection and a first channel and receive a first response message associated with a second cross-connection and a second channel. Additionally, the apparatus includes a message sender configured to send a first request message associated with the second cross-connection and the second channel and send a first response message associated with the first cross-connection and the first channel. Moreover, the apparatus includes a memory system configured to store at least information associated with a first squelch table. Also, the apparatus includes a processing system coupled to the message receiver, the message sender, and the memory system. The processing system is configured to generate a first squelch entry associated with the second channel in the first squelch table, the first squelch table free from any squelch entry associated with the second channel other than the first squelch entry, process information associated with the first response message, and modify the first squelch entry in response to at least information associated with the first response message. The processing system is also configured to process information associated with the first request message and the first squelch table, determine whether the first squelch table includes a second squelch entry associated with the first channel, process information associated with the first request message, and modify the second squelch entry in response to at least information associated with the first request message.

As discussed above, certain embodiments of the present invention can generate some or all of the following alarm messages. Invalid cross-connection message indicates the user enters an invalid cross-connection, e.g. DR on the outgoing channel. Invalid entry message indicates detection of an invalid squelch table entry, e.g. AD on an incoming channel. Invalid request message indicates inconsistent received request message, e.g., when an DA message is received by a node that has and AD entry on the same channel. A response failure message indicates a response to a request is not received within a predetermined period times for over a predetermined number of times. Inconsistent squelch message indicates inconsistent squelch tables when cross-connection table entries do not reflect squelch table entries. Incomplete update message indicates. an update to squelch table at a node is not complete.

The present invention has various advantages. Certain embodiments of the present invention operate in either manual mode or automatic mode selectively for every network node or every network ring. The internal massaging enables the network nodes on a network ring to simultaneously enter manual mode or automatic mode. Some embodiments of the present invention provide support for STS-level squelching, VT-level squelching, or both. Any mismatch of cross-connection types can be identified by certain protocols in the present invention. Certain embodiments of the present invention provides an alarm indication if any entry in the cross-connection table does not have a corresponding entry in the squelch table. Some embodiments of the present invention can initiate an update of a squelch table at any time for any specific node. Certain embodiments of the present invention can initialize a squelch table by restore the backup table from memory. Some embodiments of the present invention can perform automatic update of squelch table even under single ring failure conditions. Certain embodiments of the present invention provide an appropriate designation to indicate that a time slot is unassigned or does not have a cross-connection. Some embodiments of the present invention can allow for the in-service change of Node ID of a network node without causing a flood of messages to readjust the squelch tables. Certain embodiments of the present invention can detect mismatches in payloads through the protocol and help in diagnostic issues regarding squelching and provisions of cross-connections. Some embodiments of the present invention have the flexibility to transmit protocol messages over the overhead SONET bytes or the DCC channels. Certain embodiments of the present invention use only 32 bits to communicate a squelch entry data to the neighboring node. Some embodiments of the present invention can transport information unrelated to squelching over a BLSR ring. Certain embodiments of the present invention use scaleable and expandable protocol to cope with various BLSR rates for both STS and VT level squelching. For example, the BLSR rates may be those of OF-48, OF-192 and OF-768.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims. For example, certain embodiments of the present invention may be used in SONET or any other network. As another example, some embodiments of the present invention may be used in a BLSR ring or any other network ring.

What is claimed is:

1. A method for processing a squelch table for optical network applications, the method comprising:
   receiving a first cross-connection entry associated with a first cross-connection and a first channel;
   generating a first squelch entry associated with the first channel in a first squelch table associated with a first node, the first squelch table free from any squelch entry associated with the first channel other than the first squelch entry;
   sending a first request message associated with the first cross-connection to a second node, the second node being a neighboring node to the first node;
   if a first response message associated with the first cross-connection is received at the first node in response to the first request message within a predetermined period of time,
      processing information associated with the first response message;
      modifying the first squelch entry in response to at least information associated with the first response message.

2. The method of claim 1 wherein the first request message comprises a source node identification field associated with a source node related to the first cross-connection and a destination node identification field associated with a destination node related to the first cross-connection.

3. The method of claim 2 wherein the first request message further comprises a message identification field associated with a message identification.

4. The method of claim 3 wherein the message identification is related to at least one selected from a group consisting of AD, DR, DA, DD, NO, and NS.

5. The method of claim 3 wherein the first request message further comprises a request/response field indicating the first request message being a request.

6. The method of claim 5 wherein the first request message further comprises a direction field associated with a direction related to the first request message, wherein the direction is west or east.

7. The method of claim 6 wherein the first request message further comprises a channel indicator associated with a channel identification corresponding to the first squelch table.

8. The method of claim 7 wherein the first request message further comprises a VT indicator associated with a VT identification corresponding to the first squelch table.

9. The method of claim 1 wherein the first channel is a STS channel or a VT channel.

10. The method of claim 1 wherein the modified first squelch entry comprises complete squelch information associated with the first cross-connection.

11. The method of claim 1, and further comprising:
   if the first response message is not received at the first node within the predetermined period of time and the first request message is sent for more than a predetermined number of times, sending a first alarm message indicating a failure to receive the first response message;
   if the first response message is not received at the first node within the predetermined period of time and the first request message is sent for less than or equal to a predetermined number of times, sending the first request message to the second node.

12. The method of claim 11, and further comprising:
   processing information associated with a first ring map related to the first node;
   determining whether the first ring map is complete based on at least information associated with the first ring map.

13. The method of claim 12, and further comprising:
   providing a first indication associated with the generating a first squelch entry;
   providing a second indication associated with the generating a first squelch entry.

14. A method for processing a squelch table for optical network applications, the method comprising:
   receiving a first request message associated with a first cross-connection and a first channel;
   processing information associated with the first request message and a first squelch table at a first node;
   determining whether the first squelch table includes a first squelch entry associated with the first channel;
   if the first squelch table is free from the first squelch entry, sending a first response message;
   if the first squelch table includes the first squelch entry,
      processing information associated with the first request message;
      modifying the first squelch entry in response to at least information associated with the first request message;
      sending a second response message associated with the first cross-connection.

15. The method of claim 14 wherein the first response message is associated with NO cross-connection.

16. The method of claim 14 wherein the second response message comprises a source node identification field associated with a source node related to the first cross-connection and a destination node identification field associated with a destination node related to the first cross-connection.

17. The method of claim 16 wherein the second response message further comprises a message identification field associated with a message identification.

18. The method of claim 17 wherein the message identification is related to at least one selected from a group consisting of AD, DR, DA, DD, NO, and NS.

19. The method of claim 17 wherein the second response message further comprises a request/response field indicating the second response message being a response.

20. The method of claim 19 wherein the second response message further comprises a direction field associated with a direction related to the second response message, wherein the direction is west or east.

21. The method of claim 20 wherein the second response message further comprises a channel indicator associated with a channel identification corresponding to the first squelch table.

22. The method of claim 21 wherein the first request message further comprises a VT indicator associated with a VT identification corresponding to the first squelch table.

23. The method of claim 14 wherein the first channel is a STS channel or a VT channel.

24. An apparatus for processing a squelch table for optical network applications, the apparatus comprising:
a message receiver configured to
receive a first request message associated with a first cross-connection and a first channel;
receive a first response message associated with a second cross-connection and a second channel;
a message sender configured to
send the first request message associated with the second cross-connection and the second channel;
send the first response message associated with the first cross-connection and the first channel;
a memory system configured to store at least information associated with a first squelch table;
a processing system coupled to the message receiver, the message sender, and the memory system and is configured to
generate a first squelch entry associated with the second channel in the first squelch table, the first squelch table free from any squelch entry associated with the second channel other than the first squelch entry;
process information associated with the first response message;
modify the first squelch entry in response to at least information associated with the first response message;
process information associated with the first request message and the first squelch table;
determine whether the first squelch table includes a second squelch entry associated with the first channel;
process information associated with the first request message;
modify the second squelch entry in response to at least information associated with the first request message.

25. The method of claim 24 wherein the first channel is a STS channel or a VT channel.

26. The method of claim 24 wherein the first channel and the second channel are the same channel.

27. The method of claim 24 wherein the first channel and the second channel are different channels.

* * * * *